United States Patent
Ueda

(10) Patent No.: US 9,256,379 B2
(45) Date of Patent: Feb. 9, 2016

(54) APPARATUS CONTAINING PHOTOISOMERIZATION COMPOUND

(75) Inventor: Masahiro Ueda, Kyoto (JP)

(73) Assignee: EMPIRE TECHNOLOGIES DEVELOPMENT LLC, Wilmington, DE (US)

( * ) Notice: Subject to any disclaimer, the term of this patent is extended or adjusted under 35 U.S.C. 154(b) by 810 days.

(21) Appl. No.: 13/124,558

(22) PCT Filed: Nov. 19, 2010

(86) PCT No.: PCT/US2010/057380
§ 371 (c)(1),
(2), (4) Date: Apr. 15, 2011

(87) PCT Pub. No.: WO2012/067623
PCT Pub. Date: May 24, 2012

(65) Prior Publication Data
US 2012/0130056 A1    May 24, 2012

(51) Int. Cl.
*G01N 21/00* (2006.01)
*G06F 3/06* (2006.01)
*C09K 5/16* (2006.01)

(52) U.S. Cl.
CPC ............... *G06F 3/0644* (2013.01); *C09K 5/16* (2013.01); *G06F 3/065* (2013.01); *G06F 3/0614* (2013.01); *G06F 3/0683* (2013.01); *G06F 2003/0695* (2013.01)

(58) Field of Classification Search
CPC .......... B01L 7/00; B01L 7/52; C12Q 1/6811; C40B 30/04; G02F 1/133362; G02F 1/133723; G02F 1/133734; G02F 1/133788; G02F 1/134363; G02F 2001/133738; G02F 1/0126; G02F 1/21; G02F 1/216

USPC .......... 422/82.05, 82.12, 244, 400, 186–187; 204/155–158.21; 205/340
See application file for complete search history.

(56) References Cited

U.S. PATENT DOCUMENTS 3,436,353 A * 4/1969 Dreyer et al. ................. 252/600
4,004,573 A * 1/1977 Frieling et al. ................ 126/615
(Continued)

FOREIGN PATENT DOCUMENTS

JP            58-203350 A      11/1983

OTHER PUBLICATIONS

Arias et al. , "Novel azobenzene derivatives containing a glucopyranoside moiety", Dyes and Pigments, Jul. 2000, 46(1), 37-42.
(Continued)

*Primary Examiner* — Dean Kwak
(74) *Attorney, Agent, or Firm* — Dorsey & Whitney LLP

(57) ABSTRACT

Technologies are generally described for controlling temperature using compounds capable of photoisomerization. In some examples, a temperature control apparatus includes a first receiving unit configured to contain a compound capable of photoisomerization, a second receiving unit configured to contain the compound capable of photoisomerization, a first filter configured to pass first light from a first light source, and a second filter configured to pass second light from a second light source. Further, the first and second receiving units are coupled to each other so that the compound capable of photoisomerization may be circulated between the first and second receiving units, and the compound capable of photoisomerization in the first receiving unit and the second receiving unit is photoisomerized by at least one of the first light and the second light.

17 Claims, 9 Drawing Sheets

(56) References Cited

U.S. PATENT DOCUMENTS

| | | | |
|---|---|---|---|
| 4,105,014 A | | 8/1978 | Kelly et al. |
| 4,144,999 A | * | 3/1979 | Zebuhr .................... 126/570 |
| 4,281,294 A | * | 7/1981 | Volkin ...................... 372/79 |
| 4,766,885 A | * | 8/1988 | Muramatsu .............. 126/636 |
| 5,647,343 A | | 7/1997 | Sabet |
| 6,162,986 A | * | 12/2000 | Shiotsuka et al. ........... 136/244 |
| 7,575,001 B2 | * | 8/2009 | Kaiser ...................... 126/101 |
| 8,834,805 B2 | * | 9/2014 | Owen et al. .............. 422/186.3 |
| 2006/0102468 A1 | * | 5/2006 | Monzyk et al. ............. 204/242 |

OTHER PUBLICATIONS

Wikipedia page on "Azobenzene", http://en.wikiedia.org/wiki/Azobenzene, accessed Mar. 16, 2011, 4 pages.

International Application No. PCT/US2010/057380: International Search Report dated Feb. 2, 2011, 11 pages.

Jones et al., "Energy Storage in Organic Photoisomers", Journal of Photochemistry, 1979, 10(1), 1-18.

Rodriguez et al, "Photoisomerization of Azobenzenecarboxylic Acids and Their Potassium Salts: Evidence of Structural Volume Changes Associated with Hydrogen Bond Formation", J. Phys. Chem A, 1999, 103(32), 6295-6300.

Shevchenko, "Mechanism of Thermal CIS-Trams Isomerization of Chromium(III) Complex Salts", Theoretical and Experimental Chemistry, Nov. 29, 1982, 17(6), 667-670.

Takeshita et al. "Enthalpy Changes and Reaction Volumes of Photoisomerization Reactions in Solution: Azobenzene and P-Coumaric Acid", Journal of Photochemistry and Photobiology A: Chemistry, Jun. 2, 2000, 134,(1-2), 103-109.

Wu et al, "All-Optical Switching Modulation in Poly(vinyl-carbazole)-Based Azobenzene Blends", Engineering and Science, 2003, 43, 716-720.

Zhang et al., "Large Electrocaloric Effect in Ferroelectric Polymers Near Room Temperature", Science, http://www.sciencemact.org./content/321/5890/821.abstract, Aug. 8, 2008, 321(5890), 821-823.

* cited by examiner

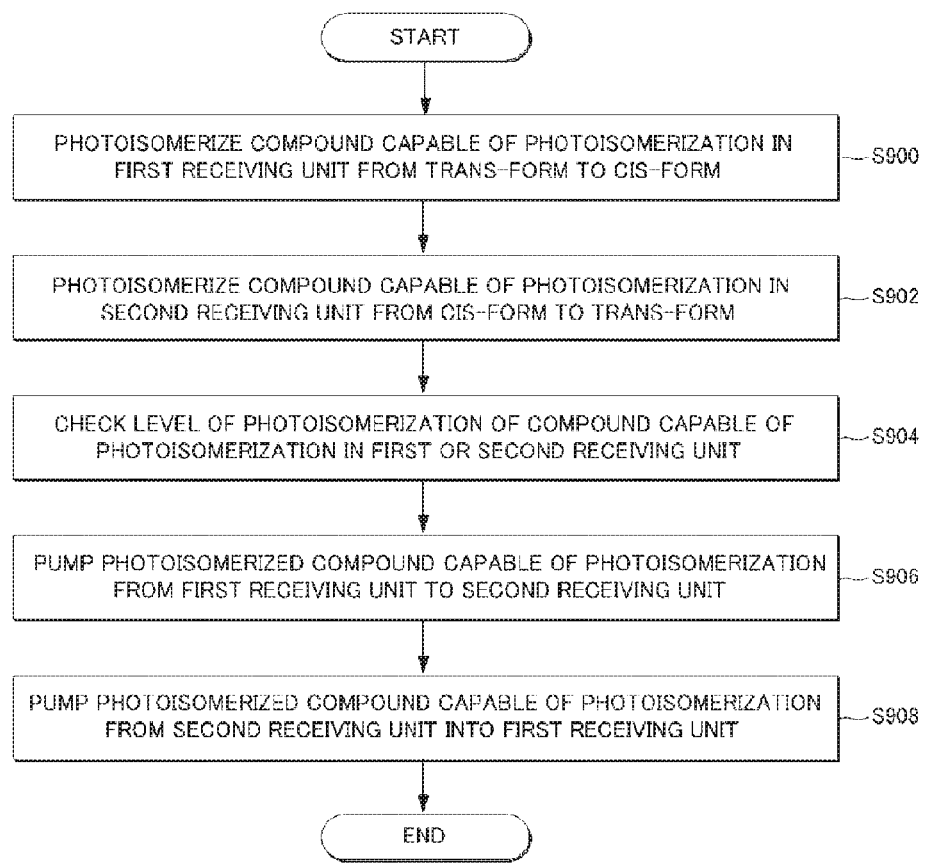

APPARATUS CONTAINING PHOTOISOMERIZATION COMPOUND

CROSS-REFERENCE TO RELATED APPLICATIONS

This application is the National Stage filing under 35 U.S.C. §371 of International Application No. PCT/US2010/057380, filed on Nov. 19, 2010, which is incorporated herein by reference in its entirety.

BACKGROUND

Unless otherwise indicated herein, the materials described in this section are not prior art to the claims in this application and are not admitted to be prior art by inclusion in this section.

Photoisomerization is molecular behavior in which a structural change between isomers is caused by photoexcitation. Photoisomerization can be observed in compounds having trans and cis isomers such as azobenzene, stilbene and their derivatives. This class of compounds may have a double bond, and rotation or inversion around the double bond may allow isomerization between the trans and cis states upon irradiation with particular wavelengths of light.

For instance, azobenzene is a chemical compound composed of two phenyl rings linked by an N=N double bond. The term "azobenzene" or simply "azo" may be used to refer to a class of molecules that share a core azobenzene structure, with different chemical functional groups extending from the phenyl rings. Azobenzene has two types of isomers, trans and cis isomers. One of the interesting properties of azobenzene (and its derivatives) is photoisomerization between the trans and cis isomers. The trans-azobenzene isomer is more stable than the cis-azobenzene isomer by approximately 50 kJ/mol (about 12 kcal/mol), and a barrier to the trans-cis photoisomerization is approximately 200 kJ/mol (about 48 kcal/mol). Therefore, azobenzene can absorb heat energy from an atmosphere or release heat energy into an atmosphere through the trans-cis photoisomerization.

SUMMARY

In an example, a temperature control apparatus may include a first receiving unit configured to contain a compound capable of photoisomerization, a second receiving unit configured to contain the compound capable of photoisomerization, a first filter configured to pass first light from a first light source, and a second filter configured to pass second light from a second light source. The first and second receiving units may be coupled such that the compound capable of photoisomerization is circulated between the first and second receiving units. The compound capable of photoisomerization may be photoisomerized by at least one of the first light and the second light.

In an example, a temperature control method may include photoisomerizing a compound capable of photoisomerization in a first receiving unit from trans-form to cis-form by first light from a first light source, photoisomerizing the compound capable of photoisomerization in a second receiving unit from cis-form to trans-form by second light from a second light source, pumping the photoisomerized cis-form compound from the first receiving unit into the second receiving unit, and pumping the photoisomerized trans-form compound from the second receiving unit into the first receiving unit.

In an example, a temperature control method may include photoisomerizing a compound capable of photoisomerization in a first receiving unit from cis-form to trans-form by first light from a first light source, photoisomerizing the compound capable of photoisomerization in a second receiving unit from trans-form to cis-form by second light from a second light source, pumping the photoisomerized trans-form compound from the first receiving unit into the second receiving unit, and pumping the photoisomerized cis-form compound from the second receiving unit into the first receiving unit.

In another example, a temperature control method may include photoisomerizing a compound in a first receiving unit by first light, wherein the compound is a compound capable of photoisomerization, pumping the compound from the first receiving unit into a second receiving unit, and photoisomerizing the compound in the second receiving unit by second light.

In another example, a temperature control apparatus may include means for photoisomerizing a compound in a first area by first light to absorb heat energy into the compound, wherein the compound is a compound capable of photoisomerization, means for pumping the compound from the first area to a second area, and means for photoisomerizing the compound in the second area by second light to release the heat energy from the compound.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 depicts an example flow diagram of a method for controlling temperature in accordance with an illustrative embodiment, all arranged according to at least some embodiments described herein.

DETAILED DESCRIPTION

Figure 1:
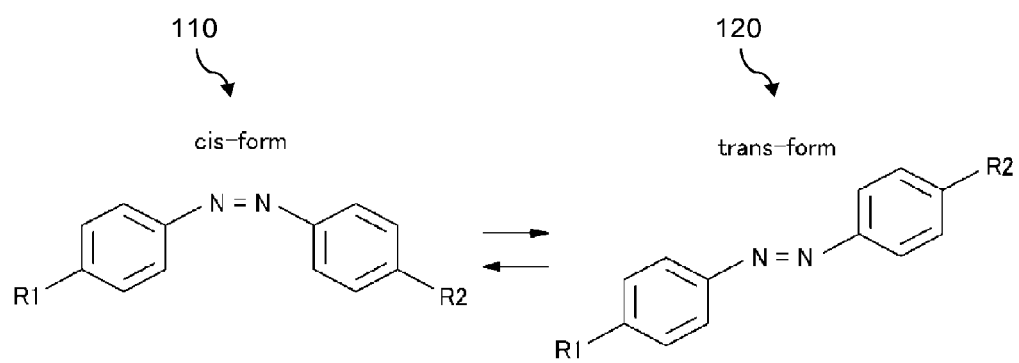
FIG. 1 shows molecular structures of a representative isomer pair of azobenzene.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

FIG. 1 shows molecular structures of a representative isomer pair of azobenzene. Azobenzene is an example of a material capable of photoisomerization. Referring to FIG. 1, FIG. 1 shows two phenyl rings on both sides of the N=N double bond of azobenzene being linked, respectively, to the Ns by a freely rotatable single bond. Phenyl rings of cis-form azobenzene 110 may be arranged in the same direction, whereas phenyl rings of trans-form azobenzene 120 may be arranged in different directions.

Figure 2:
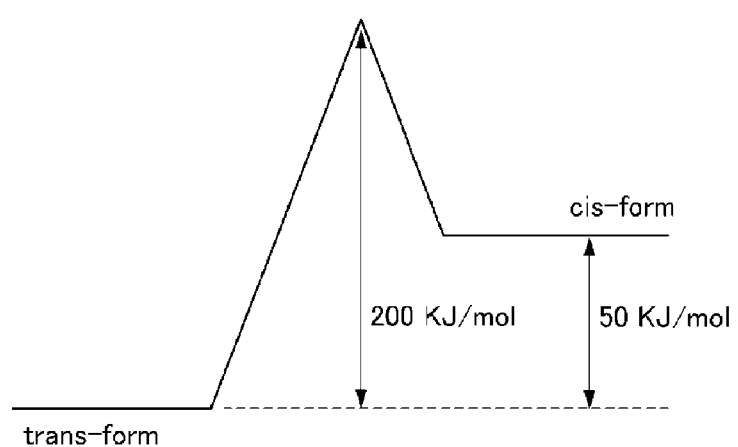
FIG. 2 illustrates an energy level of cis-form azobenzene and trans-form azobenzene.

FIG. 2 illustrates an energy level of cis-form azobenzene and trans-form azobenzene. As depicted, azobenzene can be photoisomerized from cis-form to trans-form, and vice versa. Cis-azobenzene has a higher energy level than trans-azobenzene by about 50 kJ/mol (about 12 kcal/mol). Specifically, trans-azobenzene may be photoisomerized to cis-azobenzene by irradiation of blue light, resulting in that the azobenzene absorbs heat of about 50 kJ/mol from an ambient atmosphere. On the other hand, cis-azobenzene may be photoisomerized to trans-azobenzene by irradiation of red light, resulting in that the azobenzene radiates heat of about 50 kJ/mol into an ambient atmosphere. The wavelength of the blue light is about 400 nm, and the wavelength of the red light is about 600 nm.

Techniques described in the present disclosure may employ photocaloric effect for temperature control purpose using a compound capable of photoisomerization. In an example, the compound capable of photoisomerization may include a compound having cis and trans isomers that undergoes an isomerization between the cis and trans isomers upon exposure to light having a wavelength between 350 nm and 1200 nm. In some embodiments, the compound may undergo an isomerization from a thermodynamically stable trans isomer of lower energy content to a thermodynamically less stable cis isomer of higher energy content upon exposure to a light having a wavelength between 350 nm and 1200 nm. In some embodiments, the compound may undergo an isomerization from a thermodynamically less stable cis isomer of higher energy content to a thermodynamically more stable trans isomer of lower energy content upon exposure to a light having a wavelength between 350 nm and 1200 nm. In some embodiments, such a compound capable of photoisomerization may include, but is not limited to, a compound having at least one carbon-carbon double bond, at least one nitrogen-nitrogen double bond, at least one carbon-nitrogen double bond, or combinations thereof. Examples of the compound capable of photoisomerization may include, but are not limited to, azobenzene and its derivatives, stilbene and its derivatives, and any other known compounds capable of photoisomerization between cis and trans isomers upon exposure to light having a wavelength between 350 nm and 1200 nm. The trans-azobenzene isomer is more stable than the cis-azobenzene isomer by approximately 50 kJ/mol (about 12 kcal/mol), and a barrier to the trans-cis photoisomerization is approximately 200 kJ/mol (about 48 kcal/mol). The trans isomers of stilbene and its derivatives are more stable than the cis isomers thereof by approximately 20 kJ/mol (about 4.8 kcal/mol), and a barrier to the trans-cis photoisomerization is approximately 260 kJ/mol (about 62 kcal/mol).

In some embodiments, a compound capable of photoisomerization, for example, azobenzene or a derivative thereof, may be used for temperature control. Further, the azobenzene may be dissolved in a solvent. Examples of such solvents include, but are not limited to, an aprotic solvent, an alcoholic solvent, a ketonic solvent, an etheric solvent, an esteric solvent, aromatic hydrocarbon liquid, halogenated hydrocarbon liquid, cooking oil, and combinations thereof. In other embodiments, stilbene or a derivative thereof may be used for temperature control.

Figure 3:
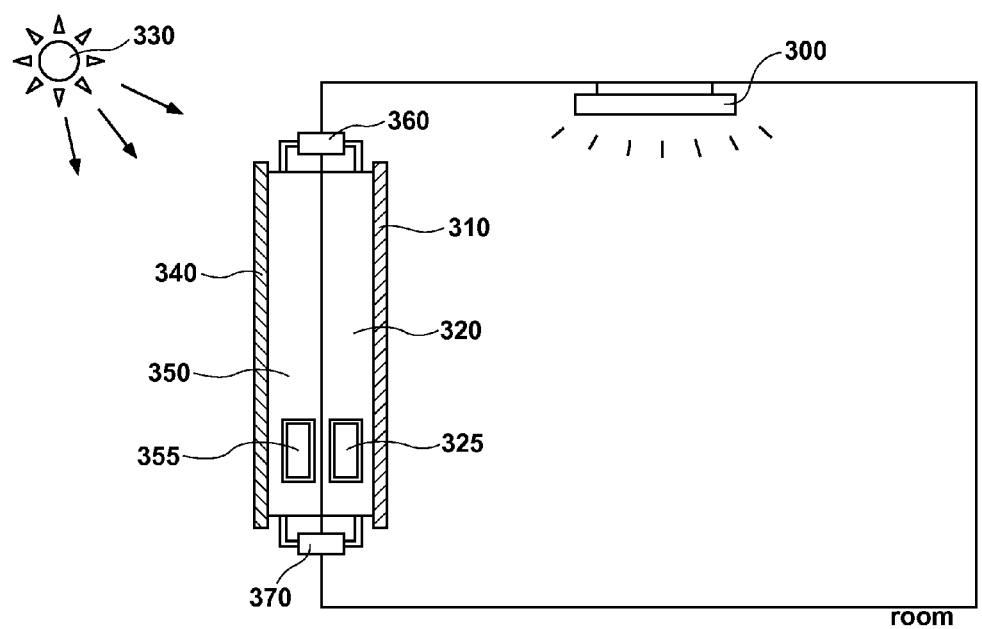
FIG. 3 is a cross-sectional view of an illustrative embodiment of a temperature control apparatus.

FIG. 3 is a cross-sectional view of an illustrative embodiment of a temperature control apparatus. As depicted, the temperature control apparatus may include a first light source 300, a first filter 310, a first receiving unit 320, a second light source 330, a second filter 340, a second receiving unit 350, a first pump 360, and a second pump 370. First light source 300, first filter 310, and first receiving unit 320 may be provided in a first space, and second light source 330, second filter 340, and second receiving unit 350 may be provided in a second space. The first space may be, but is not limited to, a location inside of a room or in the interior of a building or other enclosure. Further, the second space may be, but is not limited to, a location outside of the room or on the exterior of a building or other enclosure.

First light source 300 may irradiate light to first receiving unit 320. The light irradiated by first light source 300 may be room illumination. The room illumination may include, but is not limited to, an incandescent light, a fluorescent light, a halogen lamp, a LED lamp, and an OLED lamp.

First filter 310 may pass first light from the light irradiated by first light source 300. In cases where azobenzene or a derivative thereof is used for temperature control, the first light may be, but is not limited to, blue light having a wavelength of about 400 nm, and first filter 310 may be configured to pass blue light but block out red light. In cases where stilbene or a derivative thereof is used for temperature control, the first light may be, but is not limited to, a light having a wavelength of about 350 nm, and first filter 310 may be configured to pass a light having a wavelength of about 350 nm but block out a light having a longer wavelength.

First receiving unit 320 may contain a compound capable of photoisomerization therein. First receiving unit 320 may be covered with first filter 310, and may receive the first light passed through first filter 310. The compound capable of photoisomerization in first receiving unit 320 may be photoisomerized from trans-form to cis-form by the first light. During the photoisomerization, the compound capable of photoisomerization in first receiving unit 320 may absorb heat from an ambient atmosphere of first receiving unit 320.

Second light source 330 may be configured to irradiate light to second receiving unit 350. Second light source 330 may be, but is not limited to, sunlight. Second filter 340 may pass second light from the light irradiated by second light source 330. In cases where azobenzene or a derivative thereof is used for temperature control, the second light may be, but is not limited to, red light having a wavelength of about 600 nm, and second filter 340 may be configured to pass red light but block out blue light. In cases where stilbene or a derivative thereof is used for temperature control, the second light may be, but is not limited to, a light having a wavelength of about 500 nm, and second filter 340 may be configured to pass a light having a wavelength of about 500 nm but block out a light having a shorter wavelength. Second filter 340 may include, but is not limited to, a color filter, or a UV cut filter.

Second receiving unit 350 may contain a compound capable of photoisomerization therein. Second receiving unit 350 may be covered with second filter 340, and may receive the second light passed through second filter 340. The compound capable of photoisomerization in second receiving unit 350 may be photoisomerized from cis-form to trans-form by the second light. During the photoisomerization the compound capable of photoisomerization in second receiving unit 350 may radiate heat into an ambient atmosphere of second receiving unit 350.

In an experimental example in accordance with an illustrative embodiment of the present disclosure, a 20 wt % azobenzene solution may be prepared by dissolving azobenzene in cooking oil, and may be provided to first receiving unit 320 and second receiving unit 350. When a room having a volume of about 33.0 m³ (13.2 m²*2.50 m) is cooled with the azobenzene solution, about 0.80 kg of the azobenzene solution may be used to lower a room temperature by about 1° C. Such a result can be obtained from the following Equations 1 to 3:

$$M*E_i = 1*Q_r*W_r + 1*Q_{as}*W_{as} \qquad \text{(Equation 1)}$$

$$M = (W_{as}*1000*0.20)/M_w \qquad \text{(Equation 2)}$$

$$W_r = W_d*V_r \qquad \text{(Equation 3)}$$

Herein, Equation 1 represents energy needed to increase temperatures of the air of the room and the azobenzene solution by about 1° C., Equation 2 represents a relationship between a weight ($W_{as}$) of the azobenzene solution and a mol (M) of the azobenzene, and Equation 3 is used to calculate a weight ($W_r$) of the air of the room from a specific gravity ($W_d$) of the air of the room and a volume ($V_r$) of the room.

In Equations 1 to 3, M denotes a mole (mol) of used azobenzene, $M_w$ denotes a molecular weight of azobenzene, $E_i$ denotes isomerization energy (kcal/mol) of azobenzene, $Q_r$ denotes a specific heat (kcal/kg·K) of the air of the room, $W_d$ denotes a specific gravity (kg/m³) of the air of the room, $W_r$ denotes a weight (kg) of the air of the room, $V_r$ denotes a volume (m³) of the room, $Q_{as}$ denotes a specific heat (kcal/kg·K) of the azobenzene solution, and $W_{as}$ denotes a weight (kg) of the azobenzene solution.

Further, in Equations 1 to 3, if $M_w$ is substituted with 182, $E_i$ is substituted with 12 (kcal/mol), $Q_r$ is substituted with 0.24 (kcal/kg·K), $W_d$ is substituted with 1.29 (kg/m³), $V_r$ is substituted with 33.0 (m³), and $Q_{as}$ is substituted with 0.50 (kcal/kg·K), it can be shown that about 17 kg of the azobenzene solution is needed to lower the temperature of the room by about 1° C. from Equations 1 to 3.

First pump 360 and second pump 370 may circulate the compound capable of photoisomerization between first receiving unit 320 and second receiving unit 350.

First pump 360 may pump the compound capable of photoisomerization of first receiving unit 320 into second receiving unit 350. If the compound capable of photoisomerization of first receiving unit 320 is photoisomerized into cis-form isomer, first pump 360 may pump the compound capable of photoisomerization from first receiving unit 320 into second receiving unit 350.

As shown in FIG. 3, a photoisomerization checking unit 325 may be provided to first receiving unit 320 in order to check whether the level of photo isomerization of the compound capable of photo isomerization in first receiving unit 320 reaches a predetermined level and to provide first pump 360 with a signal showing the level of photoisomerization of the compound. Further, first pump 360 may determine whether or not to pump the compound capable of photoisomerization from first receiving unit 320 into second receiving unit 350 based on the signal. Alternatively, the photoisomerization checking unit 325 may determine that the level of photoisomerization of the compound capable of photoisomerization in the first receiving unit 320 reaches a predetermined level and may in response transmit a signal that activates first pump 360 or otherwise take actions that cause first pump 360 to pump the compound capable of photoisomerization from first receiving unit 320 into second receiving unit 350.

A photoisomerization checking unit 325 may measure a temperature of the compound capable of photoisomerization in first receiving unit 320 and determine whether the temperature reaches a predetermined temperature. When the temperature reaches to the predetermined temperature, first pump 360 may receive a control signal from the photoisomerization checking unit 325 provided to first receiving unit 320 and pump the compound capable of photoisomerization from first receiving unit 320 into second receiving unit 350 in response to the received control signal.

Second pump 370 may pump the compound capable of photoisomerization of second receiving unit 350 into first receiving unit 320. If the compound capable of photoisomerization of second receiving unit 350 is photoisomerized into trans-form isomer, second pump 370 may pump the compound from second receiving unit 350 into first receiving unit 320.

As shown in FIG. 3, a photoisomerization checking unit 355 may be provided to second receiving unit 350 in order to check whether the level of photoisomerization of the compound capable of photo isomerization of second receiving unit 350 reaches a predetermined level, and to provide second pump 370 with a signal showing the level of photoisomerization of the compound. Further, second pump 370 may determine whether or not to pump the compound capable of photoisomerization from second receiving unit 350 into first receiving unit 320 based on the signal.

A photoisomerization checking unit 355 may measure a temperature of the compound capable of photoisomerization in second receiving unit 350 and determine whether the temperature reaches a predetermined temperature. When the temperature reaches the predetermined temperature, second pump 370 may receive a control signal from the photoisomerization checking unit 355 provided to second receiving unit 350 and pump the compound capable of photoisomerization from second receiving unit 350 into first receiving unit 320 in response to the received control signal.

While the particular example illustrated in FIG. 3 has two pumps (first pump and second pump 360 and 370) configured to circulate the compound capable of photoisomerization between first receiving unit 320 and second receiving unit 350, it will be appreciated that only one pump (first pump 360 or second pump 370) may be provided between first and second receiving units 320 and 350 to circulate the compound capable of photoisomerization between first receiving unit 320 and second receiving unit 350.

Figure 4:
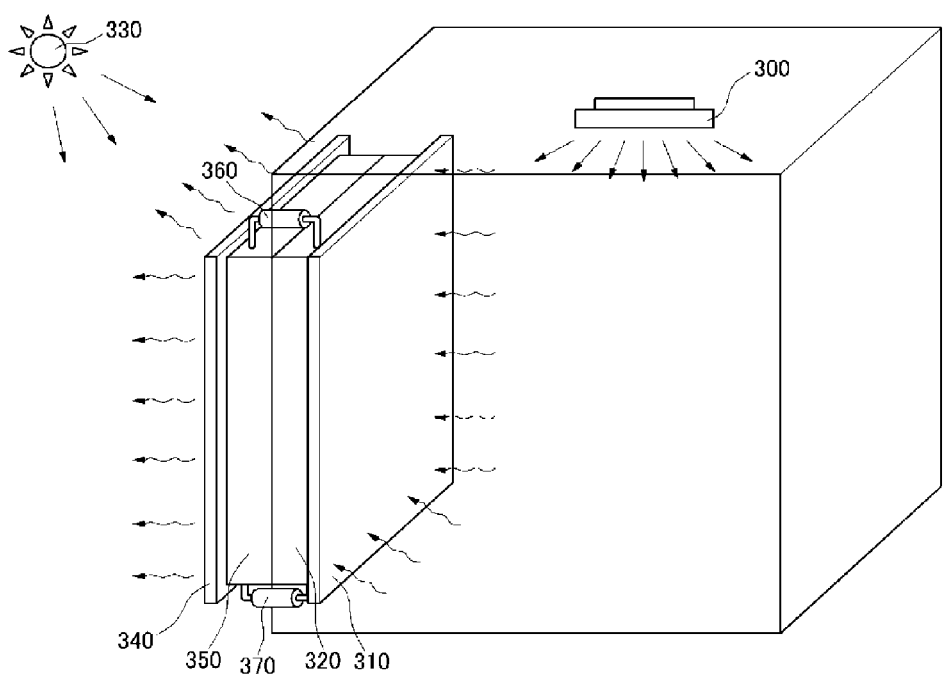
FIG. 4 is a perspective view of the temperature control apparatus shown in FIG. 3.

FIG. 4 is a perspective view of the temperature control apparatus shown in FIG. 3. As depicted, the first light irradiated from first light source 300 and passed through first filter 310 may reach the compound capable of photoisomerization in first receiving unit 320, and the compound in first receiving unit 320 may be photoisomerized from trans-form to cis-form. While the compound capable of photoisomerization in first receiving unit 320 is photoisomerized to cis-form, the compound in first receiving unit 320 may absorb heat from the ambient atmosphere of first receiving unit 320 and lower the temperature of the first space. The compound photoisomerized to cis-form may be pumped into second receiving unit 350 by first pump 360. Further, the pumped compound in second receiving unit 350 may receive the second light irradiated from second light source 330 and passed through second filter 340, and may be photoisomerized from cis-form to trans-form by the second light. While the compound capable of photoisomerization in second receiving unit 350 is photoisomerized to trans-form, the compound in second receiving unit 350 may radiate heat to the ambient atmosphere of second receiving unit 350. Then, the compound capable of photoisomerization in second receiving unit 350 may be pumped back into first receiving unit 320 by second pump 370.

In some embodiments, azobenzene or a derivative thereof may be used for temperature control, the first light passed through first filter 310 may be red light, and the second light passed through second filter 340 may be blue light. In these cases, first filter 310 may be a filter configured to pass red light but block out blue light and second filter 340 may be a filter configured to pass blue light but block out red light. If the first light is red light, the azobenzene or derivative thereof contained in first receiving unit 320 may be photoisomerized from cis-form to trans-form by the first light. Accordingly, the azobenzene or derivative thereof contained in first receiving unit 320 may radiate heat into an ambient atmosphere of first receiving unit 320 and increase a temperature of the first space. Further, if the second light is blue light, the azobenzene or derivative thereof in second receiving unit 350 may be photoisomerized from trans-form to cis-form by the second light. Accordingly, the azobenzene or derivative thereof contained in second receiving unit 350 may absorb heat from an ambient atmosphere of second receiving unit 350.

In some embodiments, stilbene or a derivative thereof may be used for temperature control, the first light passed through first filter 310 may be a light having a wavelength of about 500 nm, and the second light passed through second filter 340 may be a light having a wavelength of about 350 nm. In these cases, first filter 310 may be a filter configured to pass a light having a wavelength of about 500 nm but block out a light of shorter wavelengths, and second filter 340 may be a filter configured to pass a light having a wavelength of about 350 nm but block out a light of longer wavelengths. If the first light is irradiated, the stilbene or derivative thereof contained in first receiving unit 320 may be photoisomerized from cis-form to trans-form. Accordingly, the stilbene or derivative thereof contained in first receiving unit 320 may radiate heat into an ambient atmosphere of first receiving unit 320 and increase a temperature of the first space. Further, if the second light is irradiated, the stilbene or derivative thereof in second receiving unit 350 may be photoisomerized from trans-form to cis-form. Accordingly, the stilbene or derivative thereof contained in second receiving unit 350 may absorb heat from an ambient atmosphere of second receiving unit 350.

Figure 5:
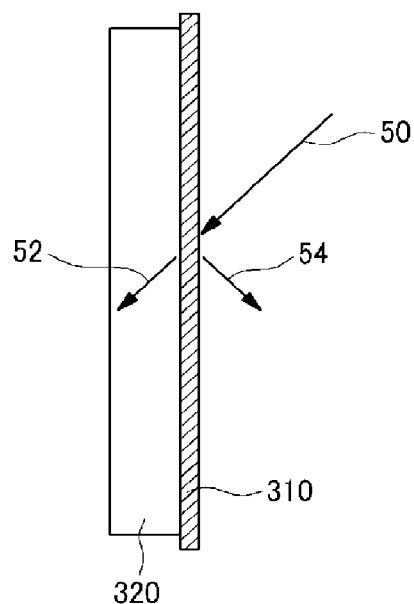
FIG. 5 is a cross-sectional view of an illustrative embodiment of a first filter and a first receiving unit shown in FIG. 3.

FIG. 5 is a cross-sectional view of an illustrative embodiment of first filter 310 and first receiving unit 320 shown in FIG. 3. As depicted, first filter 310 may pass first light 52 from light 50 irradiated from first light source 300 and filter second light 54 therefrom. In cases where azobenzene or a derivative thereof is used for temperature control, first light 52 passed through first filter 310 may be blue light and second light 54 filtered by first filter 310 may be red light. In these cases, first filter 310 may filter, for example, but not limited to, light having a wavelength longer than about 500 nm.

Figure 6:
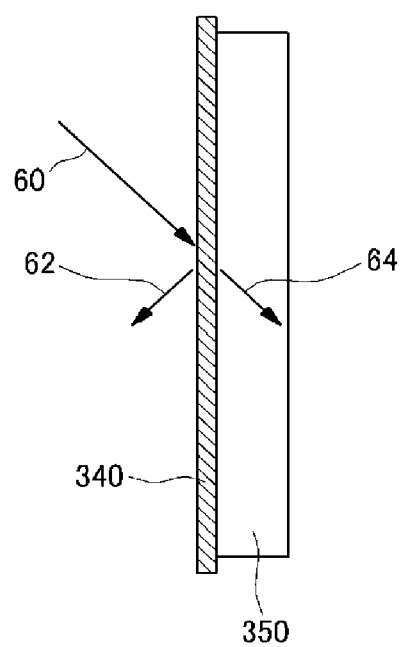
FIG. 6 is a cross-sectional view of an illustrative embodiment of a second filter and a second receiving unit shown in FIG. 3.

FIG. 6 is a cross-sectional view of an illustrative embodiment of second filter 340 and second receiving unit 350 shown in FIG. 3. As depicted, second filter 340 may pass second light 64 from light 60 irradiated from second light source 330 and filter first light 62 therefrom. In cases where azobenzene or a derivative thereof is used for temperature control, second light 64 passed through second filter 340 may be red light and first light 62 filtered by second filter 340 may be blue light. In these cases, second filter 340 may filter, for example, but not limited to, light having a wavelength shorter than about 500 nm.

Figure 7:
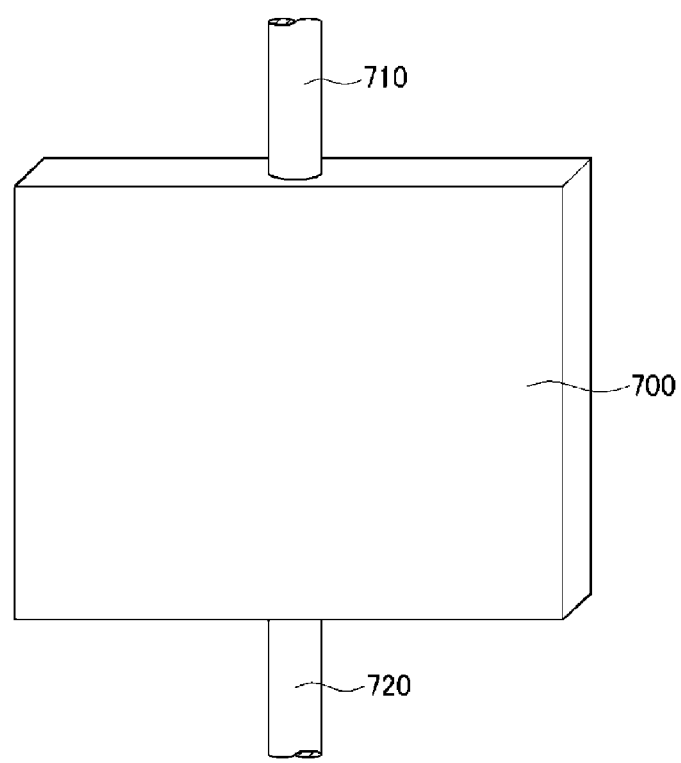
FIG. 7 shows an illustrative embodiment of a first or second receiving unit in a rectangular shape.

FIG. 7 shows an illustrative embodiment of first or second receiving unit 320 or 350 in a rectangular shape. As depicted, first or second receiving unit 320 or 350 may be formed in a rectangular shape of a large area and a small thickness. Light may be irradiated to a large surface 700 of first or second receiving unit 320 or 350 of a large area, so that a compound capable of photoisomerization in first or second receiving unit 320 or 350 can be photoisomerized effectively. First receiving unit 320 (or second receiving unit 350) may be coupled, via pipes 710 and 720, with first and second pump 360 and 370, so that the compound capable of photoisomerization in first receiving unit 320 (or second receiving unit 350) can be moved through the pipes 710 and 720.

Figure 8:
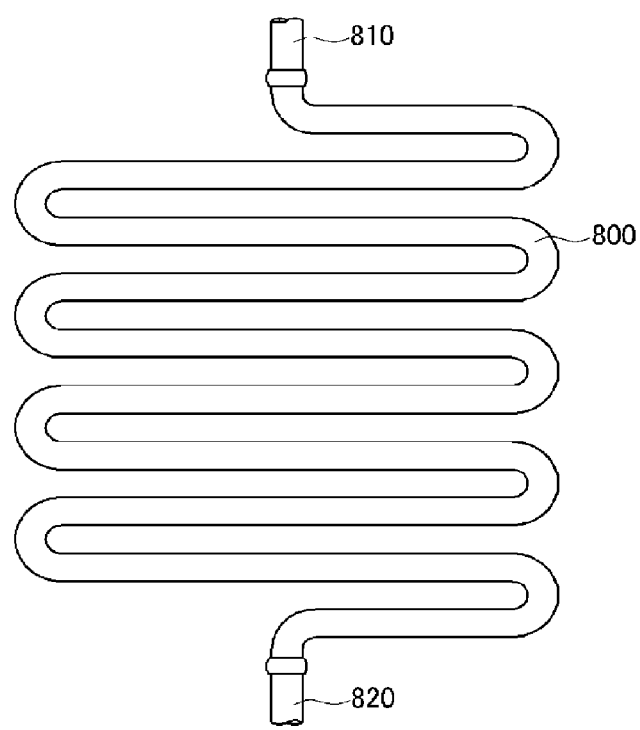
FIG. 8 illustrates an illustrative embodiment of a first or second receiving unit in a pipe shape.

FIG. 8 shows an illustrative embodiment of first or second receiving unit 320 or 350 in a pipe shape. As depicted, first or second receiving unit 320 or 350 may be formed into a pipe shape in a series of zigzags. Thus, first or second receiving unit 320 or 350 may receive light through a larger surface area 800 and exchange heat with the ambient atmosphere more effectively. Further, both ends 810 and 820 of first or second receiving unit 320 or 350 may be connected with first and second pumps 360 and 370, respectively, and a compound capable of photoisomerization in first or second receiving unit 320 or 350 may be circulated effectively by first pump 360 or second pump 370 along first or second receiving unit 320 or 350 in the pipe shape.

FIG. 9 depicts an example flow diagram of a method for controlling temperature in accordance with at least some embodiments described herein. The method in FIG. 9 could be implemented using, for example, the temperature control apparatus discussed above and two receiving units. An example process may include one or more operations, actions, or functions as illustrated by one or more of blocks S900, S902, S904, S906 and/or S908. Although illustrated as discrete blocks, various blocks may be divided into additional blocks, combined into fewer blocks, or eliminated, depending on the desired implementation. Processing may begin at block S900.

At block S900, a compound capable of photoisomerization in a first receiving unit may be photoisomerized from trans-form to cis-form. For example, referring again to FIG. 3, first light may be provided from first light source 300 to a compound capable of photoisomerization, such as azobenzene or stilbene, in first receiving unit 320 via first filter 310, and the compound capable of photoisomerization in first receiving unit 320 may be photoisomerized by the first light. In cases where the compound capable of photoisomerization is azobenzene or a derivative thereof, the first light passed through first filter 310 may be blue light having a wavelength of about 400 nm. Processing may continue from block S900 to block S902.

At block S902, a compound capable of photoisomerization in a second receiving unit may be photoisomerized from cis-form to trans-form. For example, second light may be provided from second light source 330 to a compound capable of photoisomerization, such as azobenzene or stilbene, in second receiving unit 350 via second filter 340, and the compound capable of photoisomerization in second receiving unit 350 may be photoisomerized by the second light. In cases where the compound capable of photoisomerization is stilbene or a derivative thereof, the second light passed through second filter 340 may be red light having a wavelength of about 600 nm. Processing may continue from block S902 to block S904.

At block S904, the level of photoisomerization of the compound capable of photoisomerization in one or both receiving units (for example, in first or second receiving unit 320 and/or 350) may be checked. At block S904, it may be determined whether the level of photoisomerization of the compound (for example, in first and/or second receiving unit 320 or 350) reaches a predetermined level. Further, a temperature of the compound capable of photoisomerization (for example, in first or second receiving unit 320 or 350) may be measured to determine whether the temperature reaches a predetermined temperature. Processing may continue from block S904 to block S906.

At block S906, the photoisomerized compound may be pumped from the first receiving unit to the second, for example, from first receiving unit 320 into second receiving unit 350. If the level of photoisomerization of the compound capable of photoisomerization in the first receiving unit (for example, first receiving unit 320) reaches the predetermined level, the temperature control apparatus may pump the compound in the first receiving unit into the second receiving unit, for example from first receiving unit 320 into second receiving unit 350. In some embodiments, if the temperature of the compound capable of photoisomerization in the first receiving unit (for example, first receiving unit 320) increases up to the predetermined temperature, the temperature control apparatus may pump the compound from the first receiving unit into the second receiving unit, for example, from first receiving unit 320 into second receiving unit 350. Processing may continue from block S906 to block S908.

At block S908, the photoisomerized compound may be pumped from the second receiving unit into the first receiving unit, for example, from second receiving unit 350 into first receiving unit 320. If the level of photoisomerization of the compound capable of photoisomerization in the second receiving unit (for example, second receiving unit 350) reaches the predetermined level, the temperature control apparatus may pump the compound from the second receiving unit into the first receiving unit, for example, from second receiving unit 350 into first receiving unit 320. In some embodiments, if the temperature of the compound capable of photoisomerization in the second receiving unit (for example, second receiving unit 350) decreases down to the predetermined temperature, the temperature control apparatus may pump the compound in the second receiving unit into the first receiving unit, for example, from second receiving unit 350 into first receiving unit 320.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
   a first receiving unit configured to contain a compound capable of photoisomerization;
   a second receiving unit configured to contain the compound capable of photoisomerization;
   a first filter directly coupled to the first receiving unit, the first filter being configured to pass a first light from a first light source and at least partially block a second light, wherein the first light exhibits a wavelength that is different from the second light; and
   a second filter directly coupled to the second receiving unit, the second filter being configured to pass the second light from a second light source and at least partially block the first light, wherein the second filter is different than the first filter,
   wherein the first receiving unit and the second receiving unit are coupled such that the compound capable of photoisomerization is circulated between the first and second receiving units.

2. The apparatus of claim 1, wherein the compound capable of photoisomerization in the first receiving unit and the second receiving unit is photoisomerized by at least one of the first light and the second light.

3. The apparatus of claim 1, wherein the compound capable of photoisomerization is photoisomerized from cis-form to trans-form by at least one of the first light and the second light.

4. The apparatus of claim 1, wherein the compound capable of photoisomerization is photoisomerized from trans-form to cis-form by at least one of the first light and the second light.

5. The apparatus of claim 1, further comprising:
   a first pump configured to circulate the compound capable of photoisomerization between the first receiving unit and the second receiving unit.

6. The apparatus of claim 1, further comprising:
   a second pump configured to circulate the compound capable of photoisomerization between the first receiving unit and the second receiving unit,
   wherein the first pump is further configured to pump the compound capable of photoisomerization from the first receiving unit into the second receiving unit, and
   wherein the second pump is further configured to pump the compound capable of photoisomerization from the second receiving unit into the first receiving unit.

7. The apparatus of claim 1, further comprising:
   a photoisomerization checking unit configured to determine that a level of photoisomerization of the compound capable of photoisomerization meets a predetermined level.

8. The apparatus of claim 7, wherein the photoisomerization checking unit is further configured to measure a temperature of the compound capable of photoisomerization and to determine that the temperature meets a predetermined temperature.

9. The apparatus of claim 7, wherein the photoisomerization checking unit is further configured to, responsive to determining that the level of photoisomerization of the compound capable of photoisomerization meets the predetermined level, activate a first pump configured to circulate the compound capable of photoisomerization between the first receiving unit and the second receiving unit.

10. The apparatus of claim 1, wherein the compound capable of photoisomerization comprises at least one of azobenzene, a derivative of azobenzene, stilbene, or a derivative of stilbene.

11. The apparatus of claim 1, wherein the first light comprises blue light and the second light comprises red light.

12. The apparatus of claim 1, wherein the first light has a wavelength of about 400 nm and the second light has a wavelength of about 600 nm.

13. The apparatus of claim 1, wherein the first light source comprises a room illumination and the second light source comprises sunlight.

14. The apparatus of claim 13 wherein the second light from the sunlight causes the compound capable of photoisomerization to radiate heat into an ambient atmosphere.

15. The apparatus of claim 1, wherein the compound capable of photoisomerization is dissolved in a solvent.

16. The apparatus of claim 15, wherein the solvent comprises at least one of an aprotic solvent, an alcoholic solvent, a ketonic solvent, an etheric solvent, an esteric solvent, an aromatic hydrocarbon liquid, a halogenated hydrocarbon liquid, and a cooking oil.

17. The apparatus of claim 1
   wherein the first receiving unit, first light source, and first filter are isolated from the second receiving unit, second light source, and second filter and the first receiving unit and the second receiving unit are coupled such that the compound capable of photoisomerization is circulated between the first and second receiving units.

* * * * *

UNITED STATES PATENT AND TRADEMARK OFFICE
CERTIFICATE OF CORRECTION

PATENT NO. : 9,256,379 B2  
APPLICATION NO. : 13/124558  
DATED : February 9, 2016  
INVENTOR(S) : Ueda Page 1 of 1

It is certified that error appears in the above-identified patent and that said Letters Patent is hereby corrected as shown below:

Title Page, in item (73), under "Assignee", in Column 1, Lines 1-2, delete "EMPIRE TECHNOLOGIES DEVELOPMENT LLC," and insert -- EMPIRE TECHNOLOGY DEVELOPMENT LLC, --, therefor.

In the Specification

In Column 1, Line 8, delete "§371" and insert -- § 371 --, therefor.

In the Claims

In Column 12, Line 43, in Claim 16, delete "claim 15," and insert -- claim 1, --, therefor.

Signed and Sealed this  
Second Day of August, 2016

Michelle K. Lee  
*Director of the United States Patent and Trademark Office*